No. 627,137. Patented June 20, 1899.
J. A. PERKINS.
CAGE FOR BEARINGS.
(Application filed Sept. 16, 1898.)
(No Model.)

Witnesses
Jas. J. Maloney
Harry P. Ford

Inventor,
Julius A. Perkins,
by J. P. and H. H. Livermore
Attys.

UNITED STATES PATENT OFFICE.

JULIUS A. PERKINS, OF OMAHA, NEBRASKA.

CAGE FOR BEARINGS.

SPECIFICATION forming part of Letters Patent No. 627,137, dated June 20, 1899.

Application filed September 16, 1898. Serial No. 691,079. (No model.)

*To all whom it may concern:*

Be it known that I, JULIUS A. PERKINS, of Omaha, county of Douglas, and State of Nebraska, have invented an Improvement in Cages for Bearings, of which the following description, in connection with the accompanying drawings, is a specification, like letters on the drawings representing like parts.

The present invention relates to a cage for roller-bearings and is herein shown in connection with a ball roller-bearing of the type shown in United States Patent No. 435,074 to R. W. Moffett, dated August 26, 1890, in which each roller has a ball-bearing in the cage to retain it in position, although the said cage is adapted for use with other antifriction-bearings in which the antifriction devices are separated.

It is the object of the present invention to simplify the construction of the cage and reduce the expense thereof, the various parts being adapted to be stamped out of sheet metal, as with a die, and assembled without fastening devices.

The cage embodying the invention comprises two end members or disks, each having a central opening for the spindle or shaft of the bearing, the said end members being adapted to support spindles or cross-bars extending across from one to the other to separate the rollers or antifriction devices from one another. The said end members are joined together and mutually supported by cross-pieces, each of which has a shoulder near its end and a locking projection extending beyond the said shoulder and arranged to overlie the surface of the end member and retain it against the shoulder. The said locking projections enter recesses along the edge of the end member of the cage, and the said end member rests on the shoulders and is held thereon by the tongues above mentioned. To retain the cross members in the said recesses, the cage is provided with a locking-plate arranged to engage with a portion of each locking projection to complete the cage. The several parts may all be stamped from sheet metal and assembled without fastening devices, the locking-plate serving to hold all the parts together.

Figure 1:
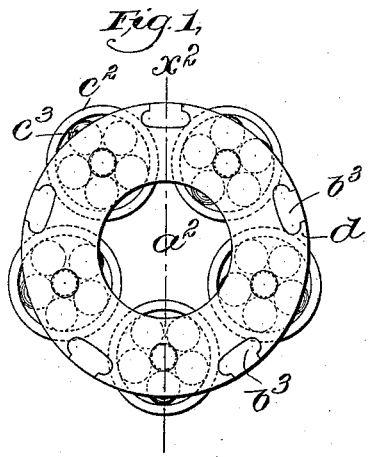
Figure 2:
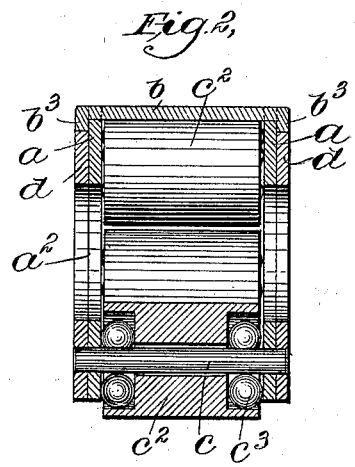
Figure 4:
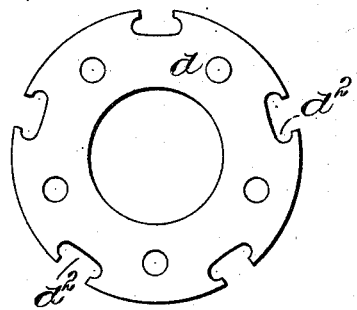
Figure 3:
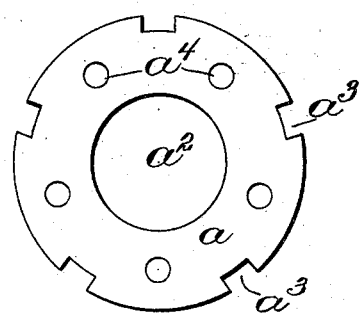
Figure 5:
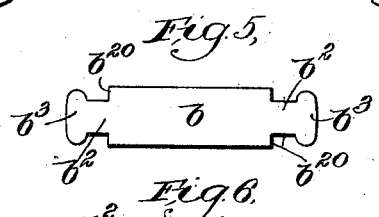
Figure 6:
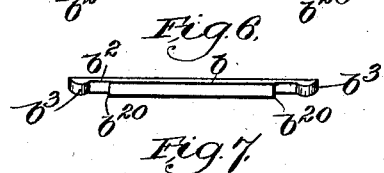

Figure 1 is an end elevation of a cage embodying the invention with the rollers assembled therein. Fig. 2 is a longitudinal section on the line $x^2$ of Fig. 1. Fig. 3 is a plan view of one of the end members of the cage. Fig. 4 is a plan view of one of the locking-plates; Fig. 5, a plan view of the blank which is first stamped out to form one of the cross members. Fig. 6 is an edge view of the same, and Fig. 7 an edge view of the cross member complete.

The end members $a$ of the cage are shown as comprising disks of sheet metal, each having a central opening $a^2$ for the bearing-shaft and recesses $a^3$ to receive the projections $b^2$ of the cross members $b$, as indicated by dotted lines, Fig. 2. The said members $a$ are also provided with holes or openings $a^4$ to receive the roller-supporting spindles $c$, as best indicated in Fig. 3. The said supporting-spindles afford the immediate support for the bearing-rollers $c^2$, between which and the spindles are the balls $c^3$. The cross members $b$ are cut to the shape indicated in Fig. 5, and at the same operation are preferably dished or made concavo-convex, as best shown in Figs. 6 and 7.

Figure 7:
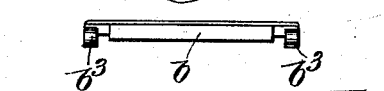

To coöperate with the locking-plate $d$, which is shown as provided with undercut recesses $d^2$ along its edges, the projection $b^2$ is provided with an enlarged portion or locking-tongue $b^3$, which is turned at a right angle, as shown in Fig. 7, when the cross member $b$ is completed.

In assembling the cage the end plates $a$ and the members $b$ are placed in position with the projections $b^2$ entering the recesses $a^3$ and the plates $a$ resting on the shoulders $b^{20}$ at the base of the tongue. The plates $a$ are then held between the shoulders $b^{20}$ and the tongues $b^3$, so that as long as the cross members $b$ remain in position the cage will be complete. To thus retain the said cross members in position and prevent them from slipping laterally out of the recesses $a^3$, the locking-plates $d$ are placed in position, as shown in Figs. 1 and 2, the tongues $b^3$ entering the recesses $d^2$ and being retained in position thereby. By cutting the recesses $d^2$ of such size and shape as to fit snugly upon the tongues $b^3$ the plates $d$ will be frictionally retained in position, there being no tendency for them to work off, since the main end plates $a$ are held by the tongues $b^3$. The said tongues, moreover, are preferably acted upon by a suitable tool to slightly flatten or rivet them, so that they overlie the plate $d$, all the parts thus being firmly held in place. The end members of the cage are then bored to receive the spindles $c$, which in the bearing shown to illustrate the invention serve to support and separate the antifriction devices, said devices in this particular bearing comprising rollers with balls interposed between them and the spindles. It is obvious, however, that the separators may be of any desired construction, the cage being adapted for use with other types of bearings.

All the parts of the cage may, as stated, be stamped out of sheet metal, and the cage can be assembled without the use of fastening devices, so that it is simple and inexpensive to construct. Furthermore, should it be necessary to remove the rollers for any reason it is obvious that the cage can be taken apart by merely prying off the locking-plates $d$ and then removing the cross members $b$.

I claim—

1. A cage for roller-bearings comprising end plates, roller-supports extending from one end plate to the other, cross members connecting said end plates, said cross members being provided with locking projections adapted to be engaged with one of said end plates, and a locking-plate to retain said cross members and said end plate in engagement, substantially as described.

2. A cage for roller-bearings comprising end members to support the roller-spindles, said end members consisting of plates having recesses cut along their peripheries, cross members provided with shoulders to engage the surfaces of said plates, and projections beyond said shoulders to enter the recesses, tongues at the ends of said projections to overlie said plates and retain them in engagement with the shoulders, and locking-plates to engage said tongues and prevent lateral displacement of the cross members, substantially as described.

3. The combination with the plates $a$ provided with peripheral recesses $a^3$, of the cross members $b$ having the projections $b^2$ and tongues $B^3$, and the locking-plates $d$ having peripheral recesses of such shape as to fit said tongues, substantially as described.

4. The combination with the plates $a$, of the spindles $c$, the rollers $c^2$ and the balls $c^3$ affording a bearing for said rollers on said spindles, the cross members $b$ connecting the plates $a$, and a locking-plate $d$ to coöperate with said members $b$, substantially as described.

In testimony whereof I have signed my name to this specification in the presence of two subscribing witnesses.

JULIUS A. PERKINS.

Witnesses:
H. J. LIVERMORE,
NANCY P. FORD.